(12) United States Patent
Youk et al.

(10) Patent No.: US 10,905,301 B2
(45) Date of Patent: Feb. 2, 2021

(54) CLEANER

(71) Applicant: LG ELECTRONICS INC., Seoul (KR)

(72) Inventors: Hyungkyu Youk, Seoul (KR); Sangjo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 476 days.

(21) Appl. No.: 15/856,581

(22) Filed: Dec. 28, 2017

(65) Prior Publication Data

US 2018/0184869 A1  Jul. 5, 2018

(30) Foreign Application Priority Data

Dec. 30, 2016 (KR) .................. 10-2016-0184441

(51) Int. Cl.
 *A47L 11/14* (2006.01)
 *A47L 9/28* (2006.01)
 (Continued)

(52) U.S. Cl.
 CPC ............. *A47L 9/2894* (2013.01); *A47L 9/009* (2013.01); *A47L 9/2842* (2013.01);
 (Continued)

(58) Field of Classification Search
 CPC ...... A47L 9/2894; A47L 9/009; A47L 9/2842; A47L 9/2852; A47L 9/281; A47L 11/14;
 (Continued)

(56) References Cited

U.S. PATENT DOCUMENTS

| 2005/0159268 A1 | 7/2005 | Yan |
| 2009/0071732 A1 | 3/2009 | Kim et al. |
| 2017/0215666 A1* | 8/2017 | Won ................... A47L 11/40 |

FOREIGN PATENT DOCUMENTS

| CN | 106200645 | 12/2016 |
| EP | 2 036 755 | 3/2009 |

(Continued)

OTHER PUBLICATIONS

Korean Office Action dated Jul. 30, 2018 issued in KR Application No. 10-2016-0184440.

(Continued)

*Primary Examiner* — Bryan A Evans
(74) *Attorney, Agent, or Firm* — KED & Associates, LLP

(57) ABSTRACT

The present disclosure relates to a cleaner including a cleaner main body having a controller, a wheel cover mounted on the cleaner main body, a driving module coupled to the wheel cover to be movable up and down, a driving wheel coupled to the driving module and configured to be rotatable by receiving driving force from the driving module, a suspension configured to guide the upward and downward movement of the driving module and absorb impacts while the driving module is moved up and down, a link member rotatably installed on the wheel cover, and rotated by being in contact with a protrusion of the driving module when the driving module is moved downward by a preset distance, and a switch pressed in response to the rotation of the link member to transfer a signal to the controller.

19 Claims, 16 Drawing Sheets

(51) Int. Cl.
*A47L 11/40* (2006.01)
*A47L 9/00* (2006.01)
*A47L 11/18* (2006.01)
*F16H 1/46* (2006.01)

(52) U.S. Cl.
CPC ............ *A47L 9/2852* (2013.01); *A47L 11/14* (2013.01); *A47L 11/18* (2013.01); *A47L 11/4072* (2013.01); *A47L 9/281* (2013.01); *A47L 2201/04* (2013.01); *A47L 2201/06* (2013.01); *F16H 1/46* (2013.01)

(58) Field of Classification Search
CPC .. A47L 11/18; A47L 11/4072; A47L 2201/04; A47L 2201/06; F16H 1/46
See application file for complete search history.

(56) References Cited

FOREIGN PATENT DOCUMENTS

| | | | |
|---|---|---|---|
| JP | 2016-051342 | | 4/2016 |
| JP | 2016051342 A | * | 4/2016 |
| KR | 10-0779195 | | 11/2007 |
| KR | 10-2008-0084995 | | 9/2008 |
| KR | 10-2009-0007907 | | 1/2009 |
| KR | 20090007907 A | * | 1/2009 |
| KR | 10-2009-0129029 | | 12/2009 |
| KR | 20090129029 A | * | 12/2009 |
| KR | 10-2016-0121844 | | 10/2016 |
| TW | M254994 | | 1/2005 |
| TW | M501827 | | 6/2015 |
| TW | 201621830 | | 6/2016 |

OTHER PUBLICATIONS

PCT Search Report issued in PCT Application PCT/KR2017/015469 dated Apr. 17, 2018.
Korean Office Action issued in Application 10-2018-0028199 dated Jun. 11, 2018.
PCT Search Report issued in PCT Application PCT/KR2017/015470 dated Apr. 18, 2018.
Taiwanese Office Action dated Dec. 6, 2018 issued in TW Application No. 106146298.
Taiwanese Office Action dated Dec. 21, 2018 issued in TW Application No. 106146299.
U.S. Office Action dated Nov. 19, 2018 issued in U.S. Appl. No. 15/856,384.
Korean Office Action dated Jan. 19, 2018 issued in Application No. 10-2016-0184441.
Korean Office Action dated Jan. 22, 2018 issued in Application No. 10-2016-0184440.
European Search Report dated Nov. 30, 2020 issued in EP Application No. 17888517.4.

* cited by examiner (a)

(b)

CLEANER

CROSS-REFERENCE TO RELATED APPLICATION

This application claims priority under 35 U.S.C. § 119 to Korean Application No. 10-2016-0184441, filed on Dec. 30, 2016, whose entire disclosure is hereby incorporated by reference.

BACKGROUND

1. Field

The present disclosure relates to a cleaner having driving wheels for moving a main body of the cleaner.

2. Background

A cleaner is a device that may perform a cleaning function, such as mopping or suctioning dust or other foreign materials. The cleaner may perform the cleaning function on a floor surface and may include wheels for moving a main body of the cleaner along the floor surface.

One type of cleaner may include wheels that are not driven and are roll to enable the cleaner to move when an external force, such as a push by user, is applied to a cleaner main body to move the cleaner main body relative to the floor. Other types of cleaners may be self-propelled. For example, one type of cleaner may have driven wheels that automatically rotate to move a main body based on receiving a directional input, such as sensing a movement of a cleaning nozzle by the user. In another example, a robot cleaner (also referred to as an automated cleaner) may perform a cleaning function while traveling by itself without a user's manipulation. These and other types of self-propelled cleaners may use driving wheels that are rotated based on receiving a driving force from a driving motor.

In order for the cleaner to have stable travel performance, the driving wheels should remain in contact to the floor surface to transfer the driving force even if the floor is uneven or cleaner moves through other changes in the floor surface. Consequently, a shock or impact to a driving wheel that is generated while the cleaner moves along a floor surface may be cushioned or buffered so that the driving wheel remains in contact with the floor surface.

With regard to buffering a shock or impact to a wheel of a cleaner, Korean Patent Publication No. 10-2016-0121844 (laid open on Oct. 21, 2016) discloses a suspension structure in which a driving wheel is connected to a driving arm that rotates centering on a rotating shaft, and an elastic member is connected to a housing and the driving arm to elastically support the driving arm. This structure exhibits suspension efficiency that differs depending on a rotating direction of the driving wheel. For example, this suspension structure may provide a certain level of suspension performance when the driving wheel rotates in a certain direction (e.g., clockwise), but may provide a reduced levels of suspension performance when the driving wheel rotates in another direction (e.g., counterclockwise). Furthermore, this suspension structure provides a driving motor that is connected to one side of the driving arm and has a gear portion therein, and the driving wheel is connected to another side of the driving arm, such that the driving motor, the driving arm and the driving wheel need installation spaces that may thereby occupy a large volume in the cleaner.

The above reference is incorporated by reference herein where appropriate for appropriate teachings of additional or alternative details, features and/or technical background.

A driving unit, which includes the driving wheel and the driving motor, may be formed as a module that includes a connection mechanism to couple the driving unit to the cleaner. The driving unit may also include a wire connection mechanism for electrically connecting the driving motor to a power supply in the cleaner. Furthermore, an additional component (e.g., a cover) that is separate from the driving unit, may be mounted to the driving unit upon a final assembly. Such a complicated assembling structure may increase a defect rate of the driving unit and may cause undesirable secondary effects in which other components in the cleaner may be damaged when the modular driving unit is installed in or removed from the cleaner.

In addition, the driving wheel may stop rotating when the cleaner main body is obstructed by an obstacle, or the driving wheel may continue to rotate even when the cleaner main body is lifted by the user. These types of wheel movements may reduce a stability of the cleaner and may reduce user's satisfaction with the cleaner.

BRIEF DESCRIPTION OF THE DRAWINGS

The embodiments will be described in detail with reference to the following drawings in which like reference numerals refer to like elements, and wherein.

DETAILED DESCRIPTION

Figure 1:
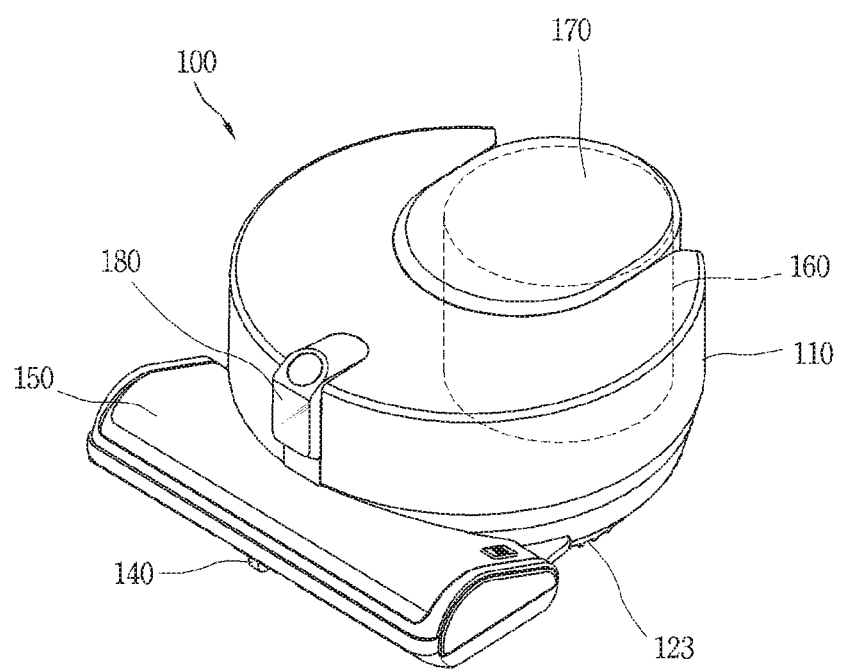
FIG. 1 is a perspective view illustrating one embodiment of a cleaner according to the present disclosure.
Figure 2:
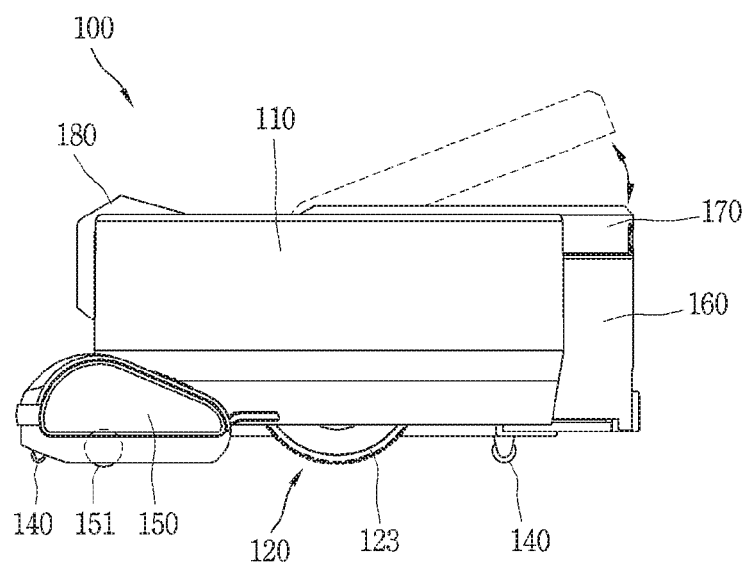
FIG. 2 is a lateral view of the cleaner illustrated in FIG. 1.

Hereinafter, a cleaner according to the present disclosure will be described in detail with reference to the accompanying drawings. FIG. 1 is a perspective view illustrating one example of a cleaner (also referred to as an autonomous cleaner or a robot cleaner) 100, and FIG. 2 is a lateral view of the cleaner 100. The robot cleaner 100 may perform a function of cleaning a floor or other horizontal surface while traveling without user control in a predetermined area. The robot cleaner 100 may clean the floor by suctioning dust and foreign materials on the floor or by mopping the floor.

The cleaner 100 may include a cleaner main body (or main body) 110 and driving wheels 123. The cleaner main body 110 may define an appearance of the cleaner 100. The cleaner main body 110 may house various components, such as a controller (not shown) for controlling the operation of the cleaner 100.

One or more of the driving wheels 123 that rotate to provide a force to move the cleaner 100 may be provided on the cleaner main body 110. The driving wheels 123 may rotate based on receiving a driving force from a driving motor 122b (see FIG. 9). In one example, the driving motor 122b may be reversible, and a rotating direction of the driving motor 122b may be controlled by the controller. Accordingly, the driving wheels 123 may be selectively rotated in one direction (e.g., clockwise) or another direction (e.g., counterclockwise). In another example, the driving motor 122b may provide the driving force in a single direction, and the controller may selectively activate one or more gears or other intermediate component to change a direction that the driving force is applied to the driving wheel 123.

In one example, the driving wheels 123 may be provided on both left and right sides of the cleaner main body 110, respectively. In another example (not shown in the drawings), a single driving wheel 123 may be provided at one section of the cleaner main body 110 of the cleaner main body 110. The cleaner main body 110 may be moved or rotated forward, backward, to the left, or to the right by operation of the driving wheels 123. The driving wheels 123 may be configured to be driven independently of each other. To this end, each of the driving wheels 123 may be driven by a different driving motor 122b. In another implementation, the driving wheels 123 may receive a driving force from a single driving motor 122b.

The cleaner 100 may further include at least one auxiliary wheel 140 that may roll and does not receive a driving force. The auxiliary wheel 140 may support the cleaner main body 110 together with the driving wheels 123 and may assist the movement of the cleaner 100 by the driving wheels 123. The auxiliary wheel 140 may be positioned at a front of the cleaner main body 110 to support a cleaner head 150. As shown in FIG. 2, the auxiliary wheel 140 may also be positioned at one or more other sections of the cleaner main body 110, such as a rear section opposite the cleaner head 150 (e.g., under a dust container 160).

The cleaner head 150 may include at least one of a suction unit or a mop unit according to a cleaning function to be performed by the cleaner 100. The cleaner head 150, as illustrated in FIGS. 1 and 2, may be arranged in a form protruding from the cleaner main body 110, or may be provided on a lower portion of the cleaner main body 110. The cleaner head 150 may be provided with an opening (not shown), and the opening may be formed to face the floor surface. The cleaner head 150 may also include a roller 151 which is configured to extend through the opening to contact and clean the floor in a rotating manner. The roller 151 may be detachably mounted in the opening. As previously described, the auxiliary wheel 140 may also be provided on the cleaner head 150.

When the cleaner 100 is configured to perform a vacuuming function to suction dust and foreign substances from the floor surface, the cleaner head 150 may correspond to a suction unit. The suction unit may be configured to suction air containing the dust and foreign materials using suction force generated by a motor (not shown) and a fan (not shown) in the cleaner 100. In the suction unit, the roller 151 may correspond to a brush unit that includes one or more brushes or blades that extend through the opening to contact or sweep the floor surface.

The dust and foreign substances included in air suctioned through the suction unit may be filtered and collected in a dust container 160. The filtered air that is separated from the dust and foreign materials may then be discharged back outside of the cleaner 100. The cleaner main body 110 may be provided with an intake flow path (not shown) that guides a flow of suctioned air from the cleaner head 150 to the dust container 160, and an exhaust flow path (not shown) that guides a flow of filtered air from the dust container 160 to the outside of the cleaner 100. The dust container 160 may be provided with at least one of a filter or a cyclone to filter the dust and foreign materials from the suctioned air from the cleaning head 150.

The cleaner 100 may include a dust container cover 170 covering the dust container 160. When the dust container cover 170 is provided to cover an upper surface of the dust container 160, the dust container 160 may be prevented from being separated from the cleaner main body 110 by the dust container cover 170. In the example shown in FIG. 2, the dust container cover 170 may be connected to the cleaner main body 110 by a hinge and may rotate around the hinge to open or close the dust container 160. In operation of the cleaner 100, the dust container cover 170 may be fixed to the dust container 160 or the cleaner main body 110 to cover an upper surface of the dust container 160.

When the cleaner 100 is configured to perform a mopping function and to mop the floor, the cleaner head 150 may include the mop unit or mop roller. The mop unit may be detachably mounted on the lower portion of the cleaner main body 110. In one example, the cleaner 100 may use one type of roller 151 (e.g., a brush unit) for performing the vacuuming function and another type of roller 151 (e.g., a mop unit) to perform the mopping function. For example, the roller 151 for the mop unit may include an absorbent surface that is designed to hold a cleaning fluid or water for mopping. Thus, the mop unit may be mounted on the cleaner main body 110 in place of the suction unit or, alternatively, a mopping roller for the mop unit may be attached to the opening of the cleaning head 150 in place of the brush unit. Accordingly, the user may selectively mount different cleaning heads 150 corresponding to one of the suction unit or the mop unit (or other type of cleaning head) according to the cleaning function. It should be appreciated that other types of cleaning heads 150 or rollers 151 may be used to provide different cleaning functions.

In certain implementations, the controller may modify one or more operations of the cleaner 100 based on whether the cleaning head 150 corresponds to the suction unit or the mop unit. For example, the controller may deactivate a suction motor in the main cleaner body 110 when the mop roller is installed. In other example, the controller may modify a rotational speed of the roller 151 based on whether the vacuuming function or the mopping function is being performed.

The cleaner main body 110 may be provided with a sensing unit (or sensor) 180 that detects an aspect of a surrounding environment of the cleaner main body 110. The sensing unit 180 may include, for example, an image sensor, an electromagnetic frequency (EMF) sensor that detects EMF emissions by the cleaner 100 or another object (e.g., a charging base), etc. The controller may sense an obstacle, detect a land feature, or generate a map of a travel area based on data on the surrounding area that are detected through the sensing unit 180. Although FIGS. 1 and 2 show the sensing unit 180 as being positioned on a front section of the cleaner main body 110, the sensing unit 180 may be additionally or alternatively positioned on a rear, side, top, and bottom surface of the cleaner main body 110.

Figure 3:
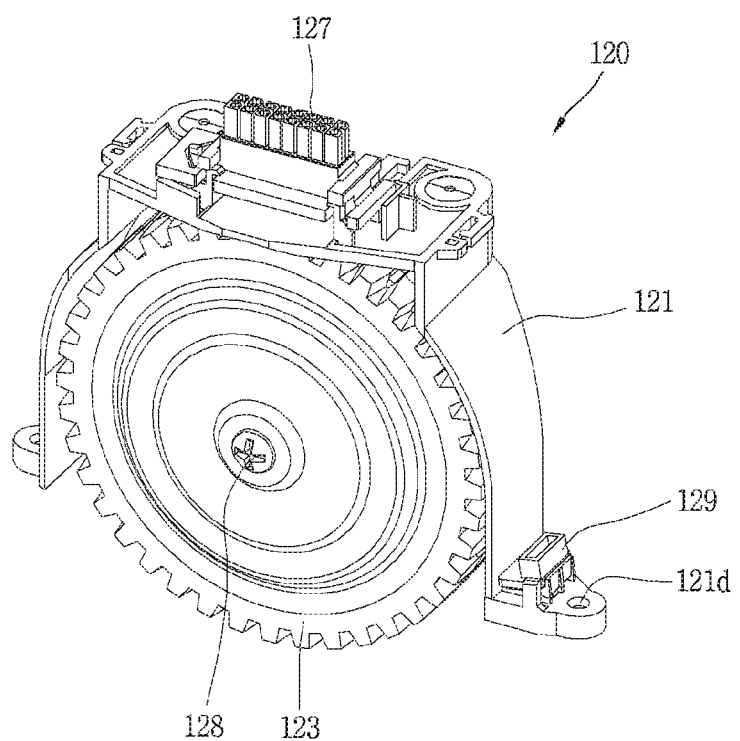
FIGS. 3 and 4 are perspective views of a wheel assembly of FIG. 2, viewed from different directions.
Figure 4:
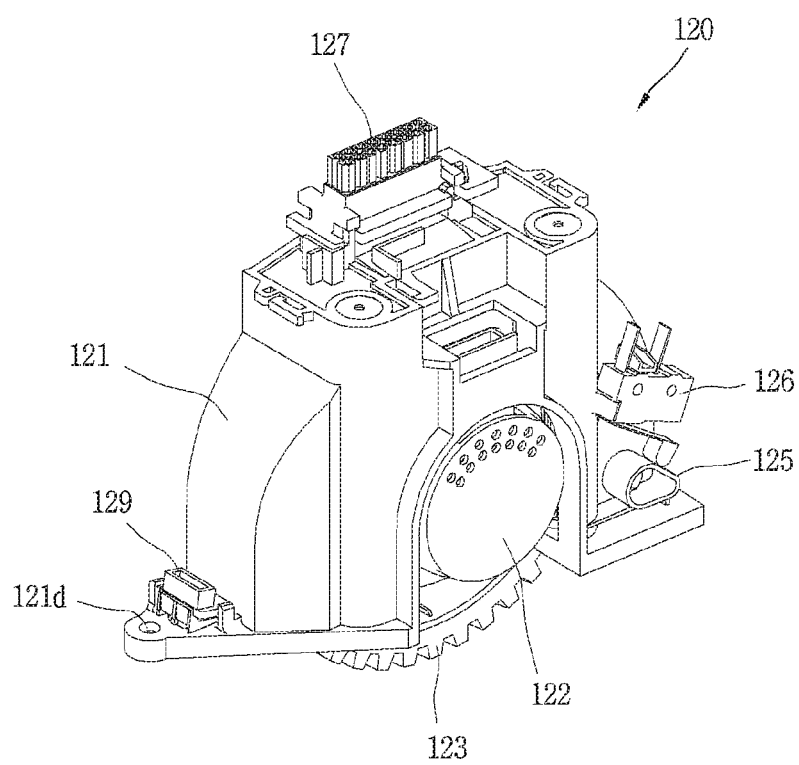
Figure 5:
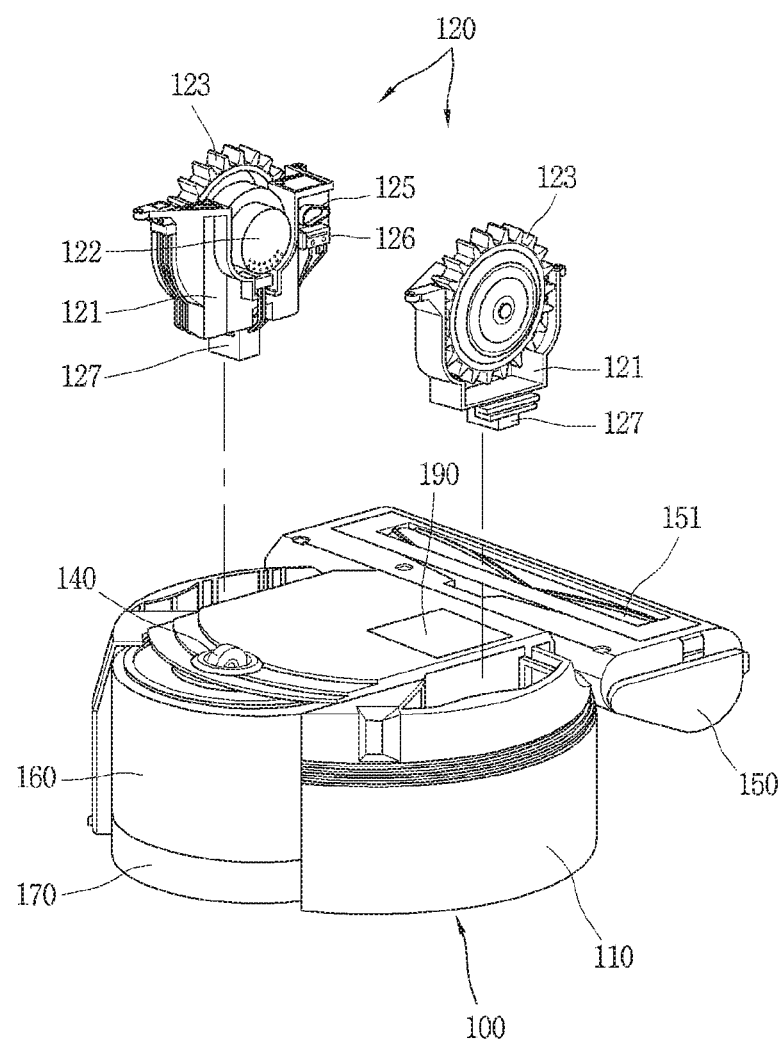
FIGS. 5 and 6 are conceptual views illustrating that wheel assemblies are detachably coupled to a lower portion of a cleaner main body illustrated in FIG. 2.
Figure 6:
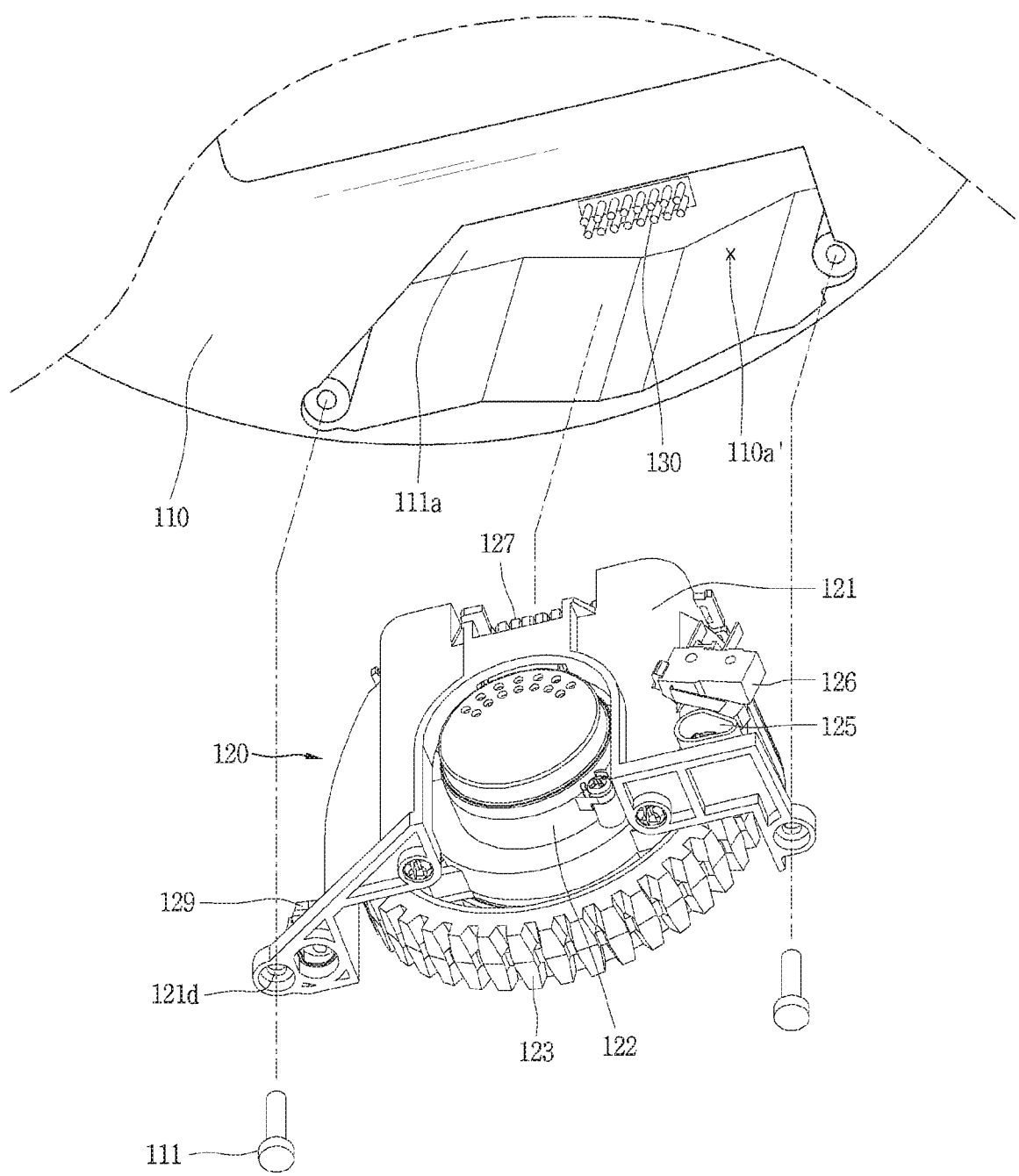

Hereinafter, the driving wheels 123 provided on the cleaner 100 will be described in more detail. FIGS. 3 and 4 show perspective views of the wheel assembly 120, viewed from different directions, and FIGS. 5 and 6 show the wheel assembly 120 being detachably coupled to the lower portion of the cleaner main body 110.

Referring to FIGS. 3 to 6, the wheel assembly 120 may include a driving module 122 for generating a driving force, the driving wheel 123 that is configured to be rotatable based on receiving the driving force from the driving module 122, and a wheel cover 121 provided to cover upper (e.g., in a direction away from the floor surface being cleaned) portions of the driving module 122 and the driving wheel 123.

The wheel assembly 120 may be detachably coupled to the cleaner main body 110. As shown in FIGS. 5 and 6, the cleaner main body 110 may include with a mounting portion (or mounting recess) 110a to receive the wheel assembly 120. In the example shown in FIGS. 5 and 6, the mounting portion 110a may open upwardly from a lower portion or surface of the cleaner main body 110.

A first connector 130 may be provided on an inner surface of the mounting portion 110a. The first connector 130 may be provided on the inner surface of the mounting portion 110a to face an opening 110a' of the mounting portion 110a. For example, the first connector 130 may be positioned on a top surface or top portion of the mounting portion 110a and may extend downward toward the floor surface. The first connector 130 may be electrically connected to the controller. For example, the controller may forward control and/or driving signals to the first connector 130 and may receive signals from the first connector 130 identifying a status of the wheel assembly 120.

The wheel assembly 120 may be provided with a second connector 127. The second connector 127 may be electrically connected to an electronic component of the wheel assembly 120. For example, the second connector 127 may be electrically connected to the driving module 122. An electric wire (not shown) may be used for the electric connection between the wheel assembly 120 and the electronic component, and the electric wire may be positioned outside of the wheel cover 121.

The second connector 127 may be configured to be coupled to the first connector 130 when the wheel assembly 120 is received in the mounting portion 110a. For example, the second connector 127 may be positioned on the wheel cover 121 and opposite to the first connector 130 on an upper portion of the wheel assembly 120, and the second connector 127 may face the inner surface of the mounting portion 110a when the wheel assembly 120 is received in the mounting portion 110a.

A direction in which the first connector 130 and the second connector 127 are connected to each other may correspond to a direction in which the wheel assembly 120 is received in the mounting portion 110a. For example, the mounting portion 110a may guide a movement of the wheel assembly 120 into the cleaner main body 110 so that the first connector 130 and the second connector 127 are accurately positioned to be coupled together when the wheel assembly 120 is inserted into the mounting portion 110a.

When the wheel assembly 120 is inserted into the mounting portion 110a formed in bottom portion of the cleaner main body 110 according to the aforementioned structure, the first connector 130 provided in the mounting portion 110a may be automatically connected to the second connector 127 provided on the wheel assembly 120. For example, the first connector 130 may include pins that are received in corresponding sockets formed in the second connector 127. This connection of the first connector 130 and the second connector 127 may facilitate the mounting and the electric connection of the wheel assembly 120 to the cleaner main body 110. In addition, when the wheel assembly 120 is not functioning correctly, the wheel assembly 120 can be detached from the cleaner main body 110 for inspection, repair, replacement, etc. This configuration may facilitate maintenance of the wheel assembly 120.

The wheel assembly 120 may be firmly fixed to the cleaner main body 110 by a coupling unit (or coupling extension) when the wheel assembly 120 is received in the mounting portion 110a, and the first and second connectors 130 and 127 are connected to each other. The coupling unit may include, for example, a hook coupling structure, a screw coupling structure, or other connecting structure between the wheel assembly 120 and the mounting portion 110a. FIGS. 3-6 shown a coupling unit that may include coupling holes 121d formed through the wheel cover 121, and coupling members (or screws) 111 that may be inserted into bosses or other receiving structures in the cleaner main body 110 through the coupling holes 121d to couple the wheel cover 121 to the cleaner main body 110.

As previously described, the second connector 127 may be electrically connected to the driving module 122, such as to forward a driving current from the controller to the driving module 122. The second connector 127 may also be electrically connected to a switch 126 or a cliff sensor 129 included in the wheel module 120.

The switch 126 may be configured to detect a downward movement of the driving wheel 123 relative to the cleaner main body 110. The switch 126 may be electrically connected to the controller via the first connector 130 and the second connector 127 to transmit a sensing signal (e.g., a signal identifying an amount of sagging detected by the switch 126). This detection signal forwarded from the switch 126 to the controller will be described in greater detail below.

The cliff sensor 129 may include a light emitting portion (or light emitter) and a light receiving portion (or light sensor). The cliff sensor 129 may be configured to measure a distance to the floor surface, for example, by measuring a round trip time delay between an emission of light from the light emitting portion toward the floor and detection by the light receiving portion of light reflected from the floor. When the floor moves away from the cleaner 100 such that a distance between the cliff sensor 129 and the floor increases, the time between the emission and the reception of the light may drastically increase. Furthermore, when a cliff (e.g., a portion of the floor that is more than a threshold distance below the cliff sensor 129) is present under the cliff sensor 129, the light receiving portion may not detect any reflected light due to scattering the light. Therefore, physical attributes of the floor surface below the wheel assembly 120 may be detected by the cliff sensor 129.

The controller may be configured to control an operation of the driving module 122 based on the detection results by the cliff sensor 129. For example, when the cliff sensor 129 detects an obstacle associated with the floor surface is at least a threshold distance below the wheel assembly 120, the controller may apply a driving signal to the driving module 122 so that the cleaner 100 reverses to travel in an opposite direction away from a detected obstacle. Alternatively, the controller may apply a driving signal only to the driving module 122 of one of the wheel assemblies 120 or apply different driving signals to the left and right wheel assemblies 120 so that the cleaner 100 rotates to turn away from the obstacle.

Although an electric connection structure including the first connector 130 in a receiving cavity 110a on a bottom portion of the cleaner main body 110 and a second connector 127 on an inserted item is described here with respect to the wheel module 120, it should be appreciated that a similar electrical connection structure may also be used with other components mounted on the cleaner main body 110.

For example, the cleaner main body 110 may receive a battery 190 that supplies power to the cleaner 100. The battery 190 may be configured to be rechargeable, and may be detachably provided in a battery accommodating portion (or battery accommodating recesses) formed on the lower portion of the cleaner main body 110 (see FIG. 5). The battery accommodating portion may be formed in a shape corresponding to the battery 190, and a third connector (not shown) may be provided on an inner surface of the battery accommodating portion to face an opening of the battery accommodating portion. A fourth connector (not shown) mating to the third connector may be provided on an upper surface of the battery 190, and this fourth connector may face the inner surface of the battery accommodating portion when the battery 190 is inserted into the battery accommodating portion. With this structure, when the battery 190 is received in the battery accommodating portion, the third connector and the fourth connector may be coupled to each other to enable an electrical connection, such as to provide a path for carrying an electrical current from battery 190 to the cleaner main body 110.

Figure 7:
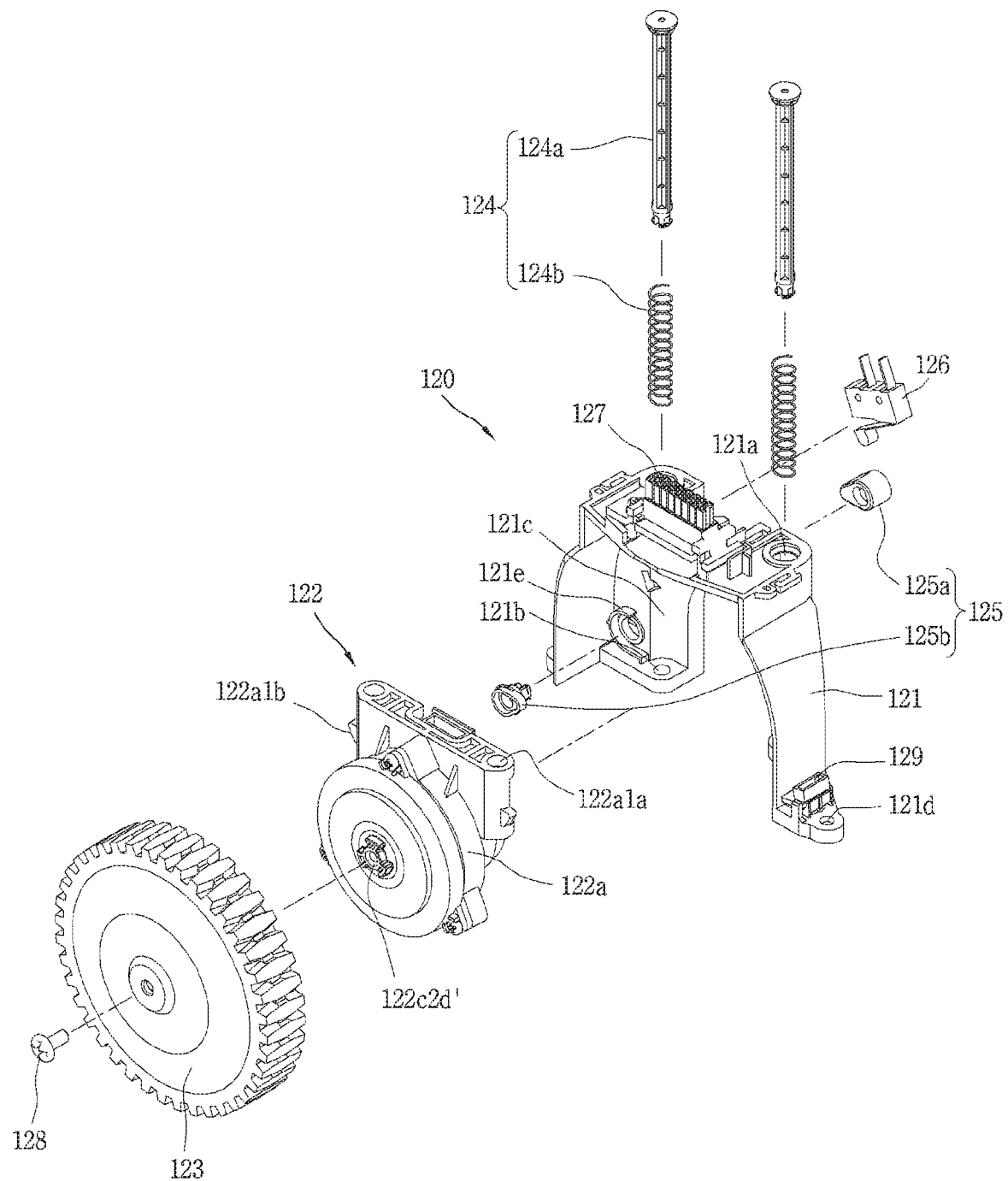
FIGS. 7 and 8 are exploded perspective views illustrating the wheel assembly of FIG. 3, viewed from different directions.
Figure 8:
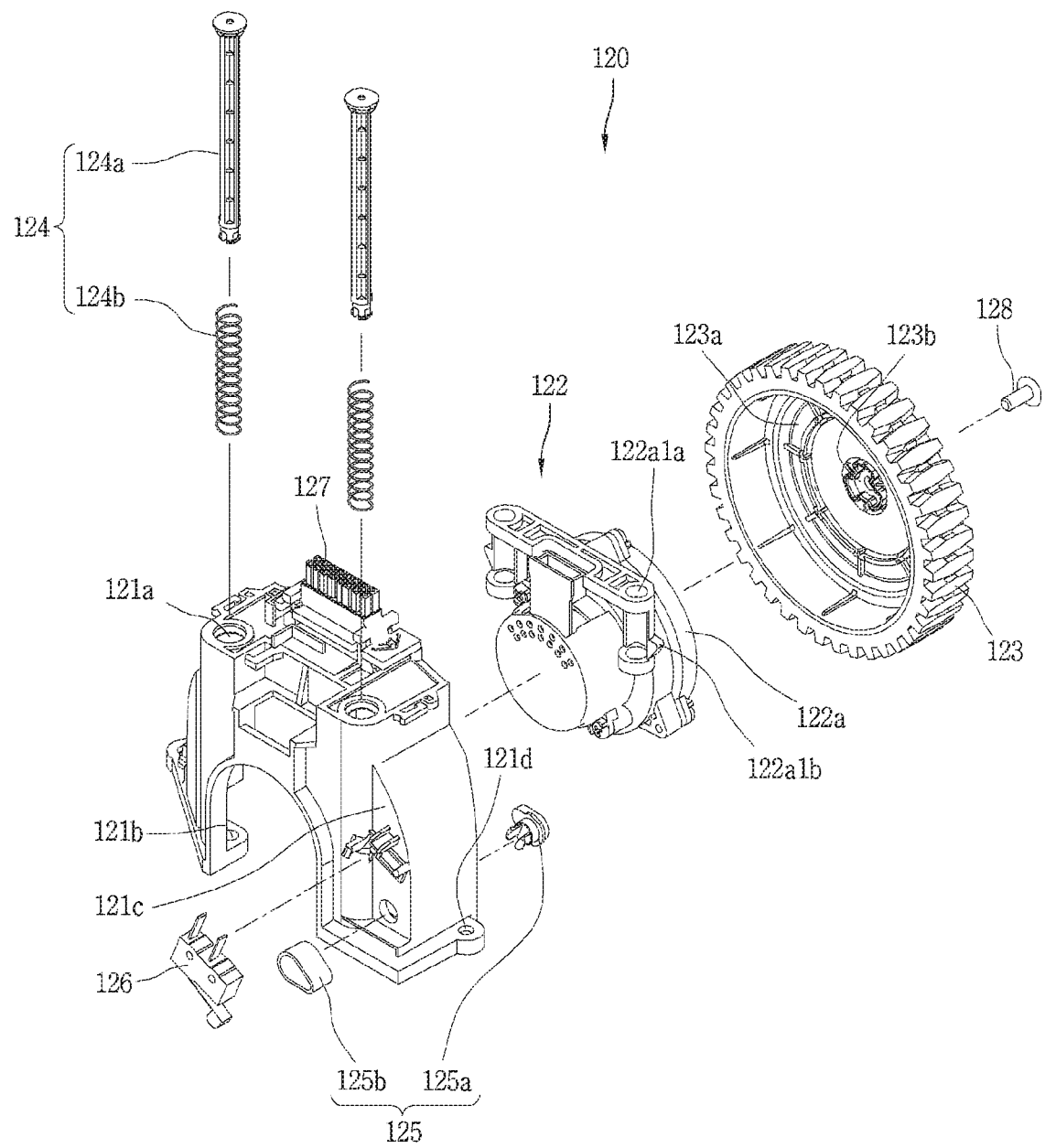
Figure 9:
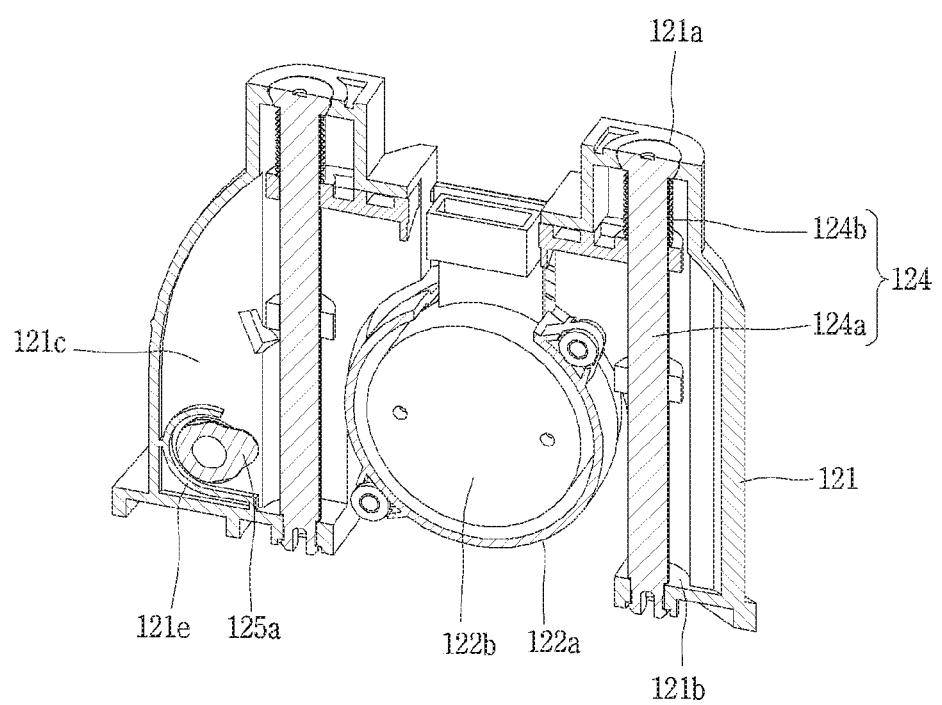
FIG. 9 is a sectional view of the wheel assembly of FIG. 3, taken along the line A-A.

FIGS. 7 and 8 show exploded perspective views of the wheel assembly 120 viewed from different directions, and FIG. 9 shows a sectional view of the wheel assembly 120 taken along the line A-A. Referring to FIGS. 7 to 9, the wheel assembly 120 may include the wheel cover 121, the driving module 122, the driving wheel 123, and a suspension 124.

The wheel cover 121 may be provided in the wheel assembly 120 to cover or enclose upper portions (e.g., portions within the main cleaner body 110) of the driving wheel 123 and the driving module 122, and the wheel assembly 120 may be detachably coupled to the cleaner main body 110. As previously described, the second connector 127, to be connected to the first connector 130 when the wheel assembly 120 is received in the mounting portion 110a, may be provided on a top portion or surface of the wheel cover 121. Coupling holes 121d may be formed through a lower portion of the wheel cover 121, and coupling members 111 may be inserted therethrough to affix the wheel cover 121 to the cleaner main body 110.

The driving module 122 may be configured to generate a driving force and to transmit the driving force to the driving wheel 123. The driving module 122 may be coupled to the wheel cover 121 so as to be vertically movable, such as to move upward or downward relative to the wheel cover 121. The vertical movement of the driving module 122 may be guided by guide bars 124a of the suspension 124. The detailed configuration of the driving module 122 will be described in greater detail below.

The driving wheel 123 may be coupled to the driving module 122, and the driving wheel 123 may rotate based on receiving the driving force from the driving module 122. The driving wheel 123 may also be configured to be vertically movable with the driving module 122 within the wheel cover 121.

The suspension 124 may guide the vertical movement of the driving module 122 and may absorb impacts while the driving module 122 is vertically moved. For example, the suspension 124 may reduce impacts applied to the cleaner main body 110 when the driving wheel 123 rolls over an uneven portion on the flow surface.

The suspension 124 may include the guide bar (or strut) 124a and an elastic member (or spring) 124b. The guide bar 124a may be configured to guide the vertical movement of the driving module 122. The guide bar 124a may be formed to extend in one direction and may be exposed above and below the wheel cover 121 through the driving module 122. FIGS. 7 and 8 illustrate that separate guide bars 124a may be provided to be inserted into the left and right sides of the driving module 122 (e.g., into through-hole 122a1a included in the module 122).

Upper and lower ends of the guide bar 124a may be fixed to the wheel cover 121. FIGS. 7 and 8 illustrate that the upper end of the guide bar 124a may be fixed to a first fixing portion (or first fixing surface) 121a formed on a top portion of the wheel cover 121, and the lower end of the guide bar 124a may be fixed to a second fixing portion (or second fixing surface) 121b formed on a bottom portion of the wheel cover 121. The first fixing portion 121a and the second fixing portion 121b are formed to face each other in an up and down direction of the wheel cover 121. The guide bar 124a may guide the driving module 122 to be vertically movable between the first fixing portion 121a and the second fixing portion 121b. For example, the driving module 122 may slide along the guide bar 124a between the first fixing portion 121a and the second fixing portion 121b.

The elastic member 124b may be configured to absorb impacts while the driving module 122 is vertically moved along the guide bar 124a. The elastic member 124b may be connected to the wheel cover 121 and the driving module 122, respectively. The elastic member 124b may be formed as a coil spring that surrounds the guide bar 124a and may be connected to the first fixing portion 121a of the wheel cover 121 and the upper portion of the driving module 122. Although not illustrated, the wheel module 120 may also include another elastic member that is connected, for example, to the second fixing portion 124b of the wheel cover 121 and the lower portion of the driving module 122.

Figure 10:
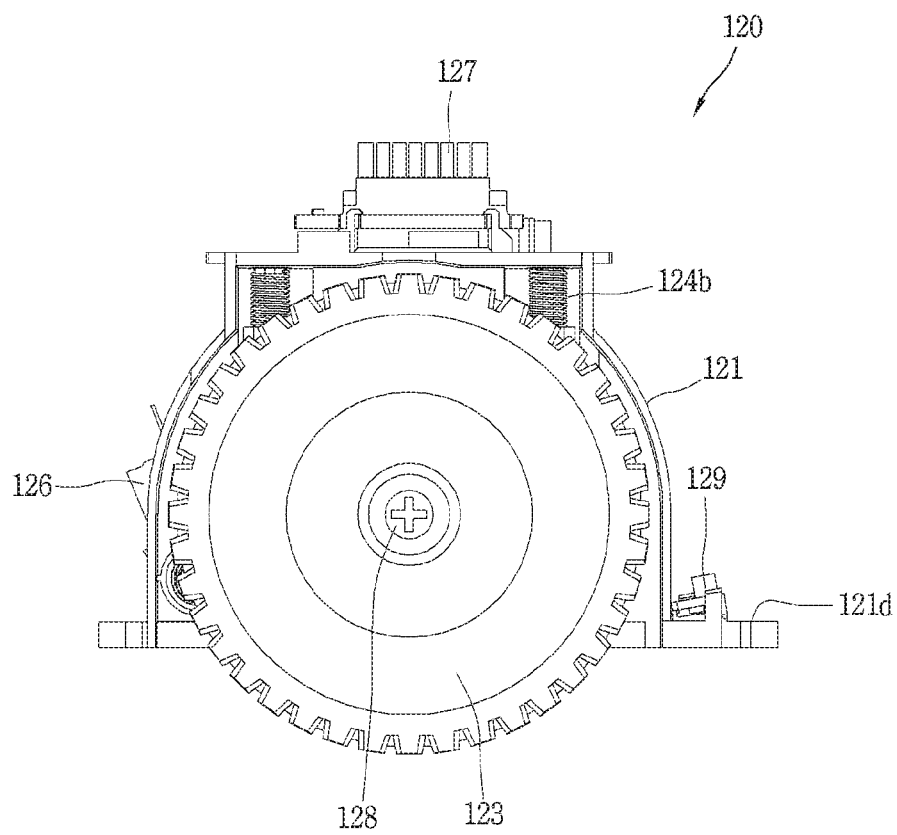
FIGS. 10 and 11 are conceptual views illustrating a state in which the driving wheel is moved upward and a state in which the driving wheel is moved downward, in the wheel assembly of FIG. 3.
Figure 11:
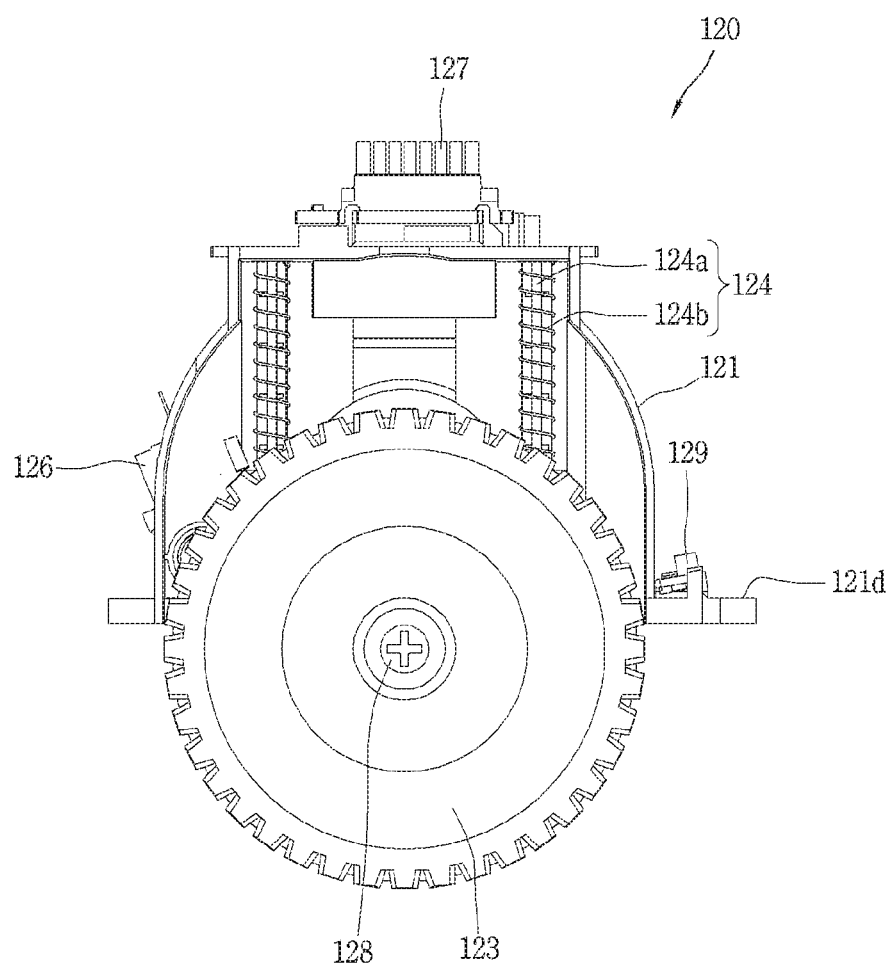

FIG. 10 illustrates a state in which the driving wheel 123 is moved upward in the wheel assembly 120 relative to the wheel cover 121, and FIG. 11 illustrates a state in which where the driving wheel 123 is moved downward in the wheel assembly 120 relative to the wheel cover 121. Referring to FIGS. 10 and 11, the driving module 122 may be configured to be vertically movable with respect to the wheel cover 121 along the guide bars 124a of the suspension 124, as previously described. The driving wheel 123 may be coupled to the driving module 122 and, thus, may move together with the driving module 122. That is, the driving wheel 123 may be configured to be vertically movable up together with the driving module 122 when a top portion of the driving wheel 123 is covered with the wheel cover 121. The upward or downward vertical movement of the driving module 122 and the driving wheel 123 may help to buffer forces received by the driving wheel 123 from the floor so that the driving wheel 123 may remain in contact with the floor.

As previously described, FIG. 10 illustrates a first (compressed) state in which the driving wheel 123 moves upward relative to the cover 121 and toward the cleaner main body 110 to compress the elastic member 124b. For example, FIG. 10 may illustrate a state in which a weight of the cleaner main body 110 is loaded on the driving wheel 123, such that the force from the weight of the cleaner main body 110 moves the driving wheel 123 relatively closer to the cleaner main body 110 within the wheel cover 121. For example, in normal operation, the cleaner main body may be supported by the driving wheel 123 while the driving module 122 applies a driving force to move the cleaner main body 110 along the floor surface. As illustrated in FIG. 10, a center of the driving wheel 123 may be located within the wheel cover 121, and in certain conditions, the driving wheel 123 may move upwards to be fully accommodated in the wheel cover 121.

FIG. 11 illustrates a second (extended) state in which the driving wheel 123 extends fully downward. For example, FIG. 11 may illustrate a state in which the driving wheel 123 in not in contact with the floor such that the elastic member 124b is fully extend and not compressed (e.g., the driving module 122 is moved by the elastic member 124b to contact the second fixing portion 121b. This second state may be understood as corresponding, for example, to the driving wheel 123 being lifted away from the floor because the cleaner main body 110 is caught by an obstacle (e.g., a peak in the floor), or the cleaner main body 110 is lifted off the floor by the user. In the second state, the driving wheel 123 is accommodated in the wheel cover 121 at a relatively minimum level. For example, as illustrated in FIG. 11, the center of the driving wheel 123 may be located below the wheel cover 121.

The particular positioned of the driving wheel 123 within the wheel assembly 120 with respect to the floor may vary depending on a state or condition of the floor while the cleaner main body 110 travels. The driving wheel 123 may move up and down between the first compressed state illustrated in FIG. 10 and the second state illustrated in FIG. 11 depending on, for example, whether the driving wheel 123 contacts the floor while the cleaner main body 110 is traveling. In this example, the elastic members 124b may also elastically support the driving module 122 connected to the driving wheel 123. With this structure, a grounding function (e.g., maintaining a contact between the driving wheel 123 to the floor) and an impact buffering function to cushion impacts to the driving wheel 123 can be concurrently performed, irrespective of a rotating direction of the driving wheel 123. Therefore, a travel stability of the cleaner 100 can be improved.

Figure 12:
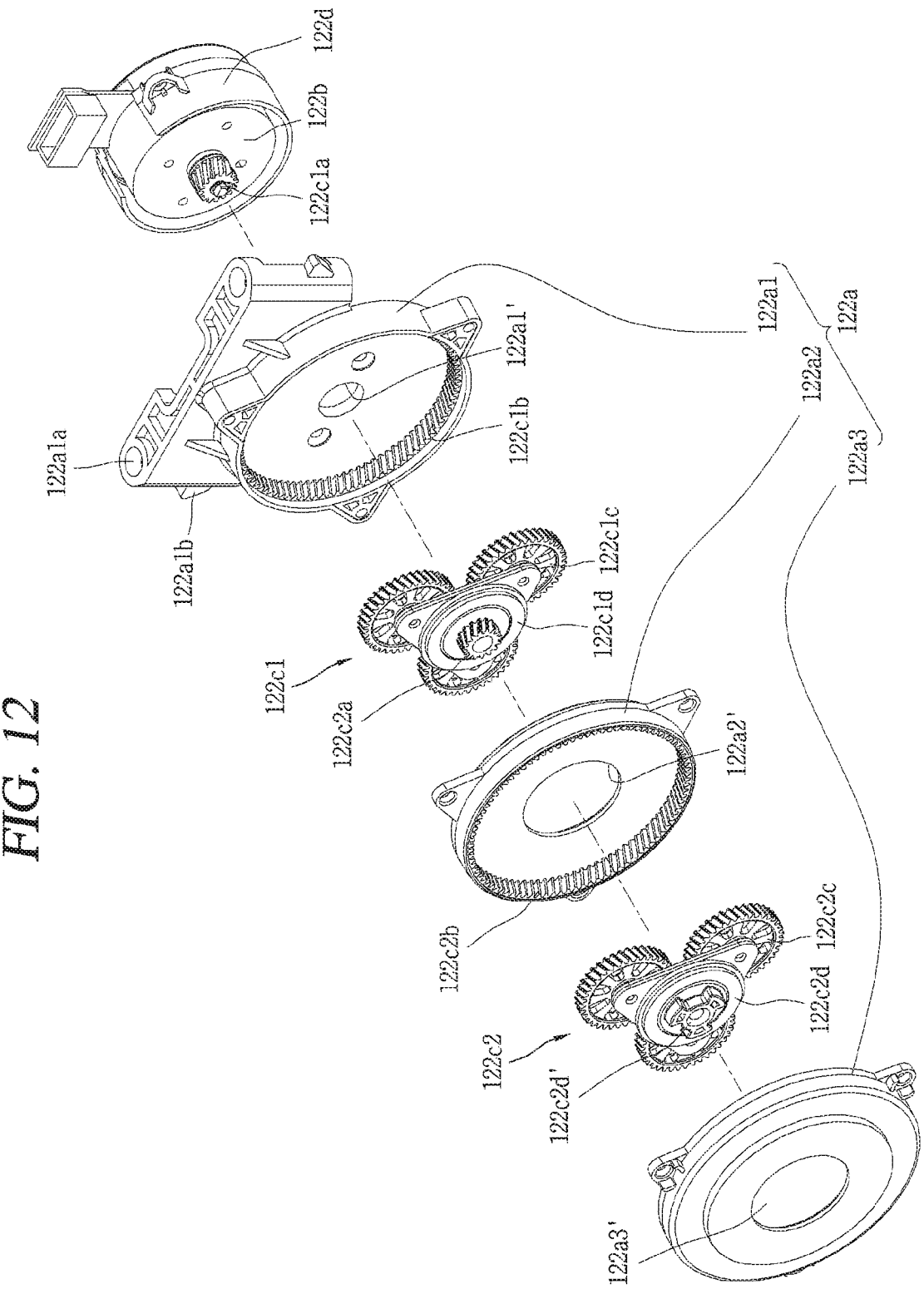
FIG. 12 is an exploded perspective view of a driving module illustrated in FIG. 7.
Figure 13:
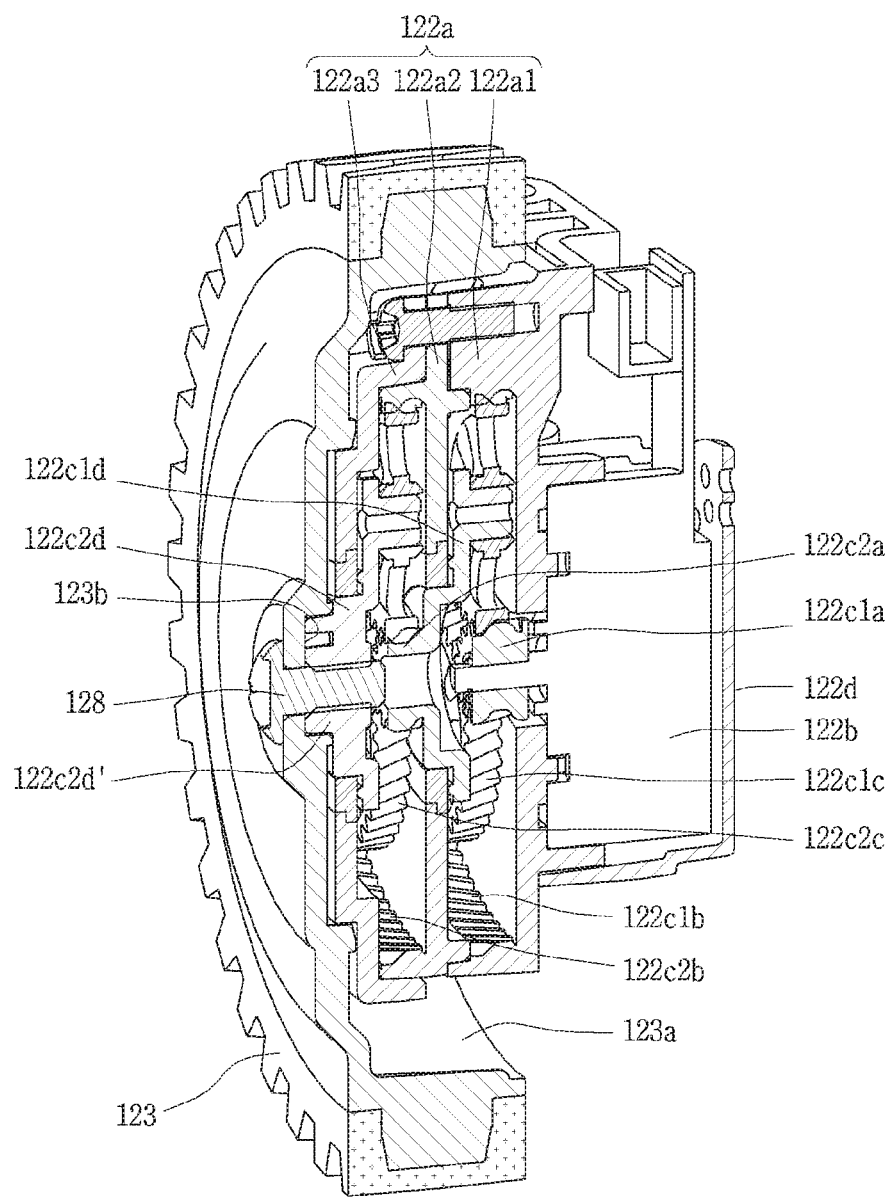
FIG. 13 is a sectional view of the wheel assembly of FIG. 3, taken along the line B-B.

FIG. 12 is an exploded perspective view of the driving module 122, and FIG. 13 is a sectional view of the wheel assembly 120 taken along the line B-B. Referring to FIGS. 12 and 13, the driving module 122 may include a case 122a, the driving motor 122b, and a planetary gear device (or planetary gear train) 122c.

The driving motor 122b may be mounted on one side of the case 122a, and the driving motor 122b may be electrically connected to the second connector 127, such that the driving motor 122b may receive driving power from the cleaner main body 110 (e.g., from the controller). As previously described, a through-hole 122a1a through which the guide bar 124a is inserted may be formed through the case 122a. Separate through-holes 122a1a may be formed on both right and left sides of the case 122a. The case 122a may be configured to be vertically movable along the guide bar 124a.

The planetary gear device 122c may connect the driving motor 122b and the driving wheel 123, and the planetary gear device 122c may modify a driving force produced by the driving motor 122b. For example, the driving motor 122b may have rotating shaft that rotates at a particular rotation speed (e.g., revolution per minute (RPM)) to output a driving force, and the planetary gear device 122c may modify the rotational speed and apply the reduced rotational speed to the driving wheel 123. The planetary gear device 122c may be provided on another side of the case 122a. The planetary gear device 122c may include one or more stages. In the example, shown in FIG. 12, the planetary gear device 122c may include two stages.

A sun gear 122c1a may be is mounted on a rotating shaft of the driving motor 122b, and the driving wheel 123 may be mounted on the case 122a that rotatably supports a rotating shaft of each of a plurality of planetary gears. With this structure, the rotating shaft of the driving motor 122b and the rotating axis of the driving wheel 123 may be coaxially provided.

Referring back to FIGS. 6 and 8, an accommodating portion (or accommodating cavity) 123a to accommodate or receive at least part of the driving module 122 may be formed inside the driving wheel 123. The planetary gear device 122c may be completely contained in the accommodating portion 123a such that a periphery of the planetary gear device 122c may be surrounded by the driving wheel 123. In this example in which the planetary gear device 122c is positioned in the accommodating portion 123a, the planetary gear device 122c may not visible from outside of the driving wheel 123.

As such, a gear device for reducing the rotational speed of the driving motor 122b and transmitting the reduced rotational speed to the driving wheel 123 can be configured as the planetary gear device 122c so that the rotating shaft of the driving motor 122b and a rotating shaft or axis of the driving wheel 123 may be coaxially placed. Furthermore, this structure may also enable the planetary gear device 122c to be accommodated inside the accommodating portion 123a formed inside the driving wheel 123 so that a width or other size of a structure related to the operation of the driving wheel 123 can be miniaturized. This minimizing of a size of the planetary gear device 122c may contribute to miniaturization of the overall size of the cleaner 100 or to enable an increase in a volume of another component of the cleaner 100 (for example, the dust container 160).

In order to obtain an appropriate rational speed reduction ratio, the planetary gear device 122c may include a first planetary gear part (or a first planetary gear stage) 122c1 and a second planetary gear part (or a second planetary gear stage) 122c2. The first planetary gear part 122c1 may be interlocked with the rotating shaft of the driving motor 122b. The second planetary gear part 122c2 may be interlocked with the first planetary gear part 122c1 and connected to the driving wheel 123.

As shown in FIG. 12, the case 122a may include a main case (or first case) 122a1, a middle case (or second case) 122a2, and a front case (or third case) 122a3. The main case 122a1 may have a through-hole 122a1a through which the guide bar 124a is inserted, as previously described. The driving motor 122b may be mounted on one side of the main case 122a1, and the first planetary gear part 122c1 may be accommodated in another side of the main case 122a1. A sun gear 122c1a on the rotating shaft of the driving motor 122b may be inserted through the main case 122*a*1. The cover 122*d* may be provided to cover the driving motor 122*b* and may be coupled to the main case 122*a*1.

The first planetary gear part 122*c*1 may include a first sun gear 122*c*1*a*, a first ring gear 122*c*1*b*, a plurality of first planetary gears 122*c*1*c*, and a first cage 122*c*1*d*. The first sun gear 122*c*1*a* may be coupled to the rotating shaft of the driving motor 122*b* and may be exposed to the another side of the main case 122*a*1 through a hole 122*a*1'. In one example, the first sun gear 122*c*1*a* may be configured to be bidirectionally rotatable according to a driving signal applied from the controller.

The first ring gear 122*c*1*b* may be provided on another side of the main case 122*a*1 (e.g., opposite the drive motor 122*b*) to receive the first sun gear 122*c*1*a*. The first sun gear 122*c*1*a* may be provided at a center of the first ring gear 122*c*1*b*. As illustrated in FIG. 12, the first ring gear 122*c*1*b* may alternatively be formed on the main case 122*a*1 itself.

The plurality of first planetary gears 122*c*1*c* may engage the first sun gear 122*c*1*a* and the first ring gear 122*c*1*b*, so as to rotate by themselves and to simultaneously revolve around the first sun gear 122*c*1*a*. In the structure in which the first ring gear 122*c*1*b* is fixed, the rotating direction of each of the plurality of first planetary gears 122*c*1*c* may be opposite to the rotating direction of the first sun gear 122*c*1*a*, and the revolving direction thereof may be the same as the rotating direction of the first sun gear 122*c*1*a*.

The first cage 122*c*1*d* may rotatably support the rotating shaft of each of the plurality of first planetary gears 122*c*1*c*. The first cage 122*c*1*d* may be arranged to cover a part of each of the plurality of first planetary gears 122*c*1*c*. The first cage 122*c*1*d* may be arranged to cover the first sun gear 122*c*1*a*, and in this case, may also be configured to rotatably support the rotating shaft of the first sun gear 122*c*1*a*.

The middle case 122*a*2 may be coupled to the main case 122*a*1. One side of the middle case 122*a*2 may cover the first planetary gear part 122*c*1 and the second planetary gear part 122*c*2 may be accommodated in another side of the middle case 122*a*2. A hole 122*a*2' enabling a connection between the first planetary gear part 122*c*1 and the second planetary gear part 122*c*2 may be formed through the middle case 122*a*2.

The second planetary gear part 122*c*2 may include a second sun gear 122*c*2*a*, a second ring gear 122*c*2*b*, a plurality of second planetary gears 122*c*2*c*, and a second cage 122*c*2*d*. The second sun gear 122*c*2*a* may protrude from the first cage 122*c*1*d* and may be exposed at the another side the middle case 122*a*2 through the hole 122*a*2'.

The second ring gear 122*c*2*b* may be provided on the another side of the middle case 122*a*2 to surround the second sun gear 122*c*2*a*. The second sun gear 122*c*2*a* may be provided at a center of the second ring gear 122*c*2*b*. As illustrated in FIG. 12, the second ring gear 122*c*2*b* may be formed on an interior radial surface of the middle case 122*a*2 itself.

The plurality of second planetary gears 122*c*2*c* may engage with the second sun gear 122*c*2*a* and the second ring gear 122*c*2*b* and, thus, may rotate by themselves and may simultaneously revolve around the second sun gear 122*c*2*a*. When the second ring gear 122*c*2*b* is fixed, a rotating direction of each of the plurality of second planetary gears 122*c*2*c* may be opposite to the rotating direction of the second sun gear 122*c*2*a*, and the revolving direction thereof may correspond to the rotating direction of the second sun gear 122*c*2*a*.

The second cage 122*c*2*d* may rotatably support the rotating shaft of each of the plurality of second planetary gears 122*c*2*c*. The second cage 122*c*2*d* may cover the second planetary gears 122*c*2*c*. The second cage 122*c*2*d* may cover the second sun gear 122*c*2*a*, and in this case, may rotatably support the rotating shaft of the second sun gear 122*c*2*a*.

The front case 122*a*3 may be coupled to the middle case 122*a*2 so as to cover the second planetary gear part 122*c*2. A hole 122*a*3' to enable a connection between the second planetary gear part 122*c*2 and the driving wheel 123 may be formed through the front case 122*a*3.

The second cage 122*c*2*d* may include a protruding portion that is inserted into the hole 122*a*3', and the protruding portion may include a coupling protrusion 122*c*2*d*' that engages a coupling groove 123*b* of the driving wheel 123. Since the coupling protrusion 122*c*2*d*' engages the coupling groove 123*b*, the driving wheel 123 may receive the driving force through the planetary gear device 122*c* and rotate based on receiving the driving force. A coupling member (or screw) 128 may be coupled to the second cage 122*c*2*d* through the driving wheel 123 to firmly affix the driving wheel 123 to the planetary gear device 122*c*.

Figure 14:
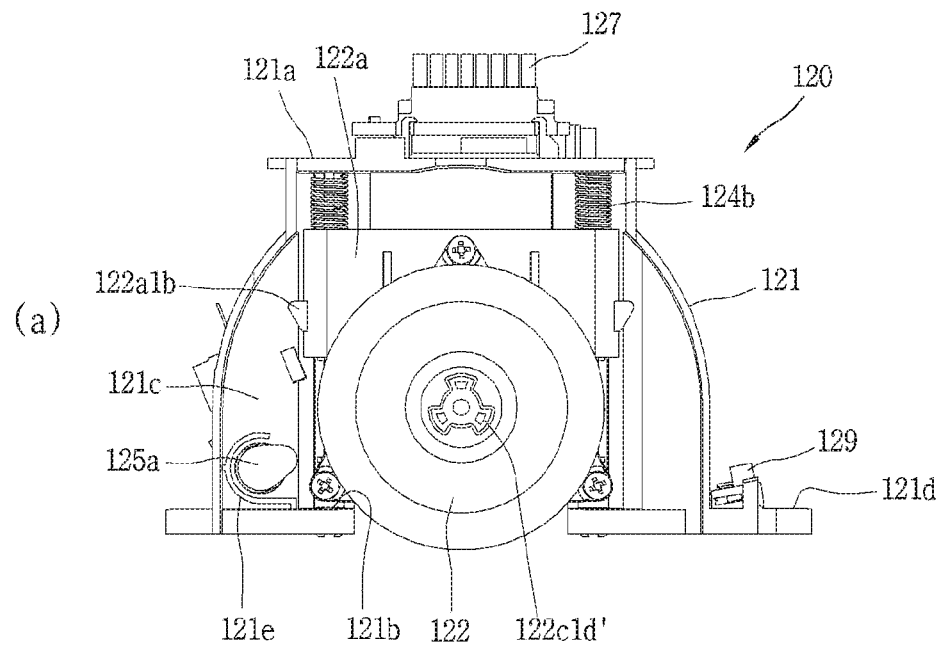
FIG. 14 is a conceptual view illustrating a state in which the driving module is moved upward in the wheel assembly of FIG. 3, viewed from a front surface (a) and a rear surface (b), respectively.
Figure 14:
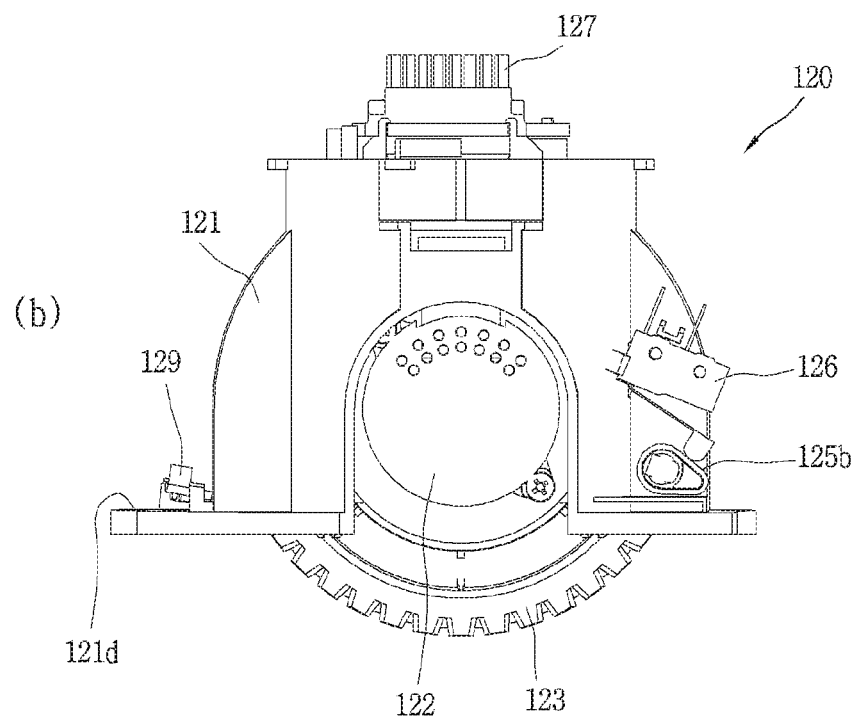
Figure 15:
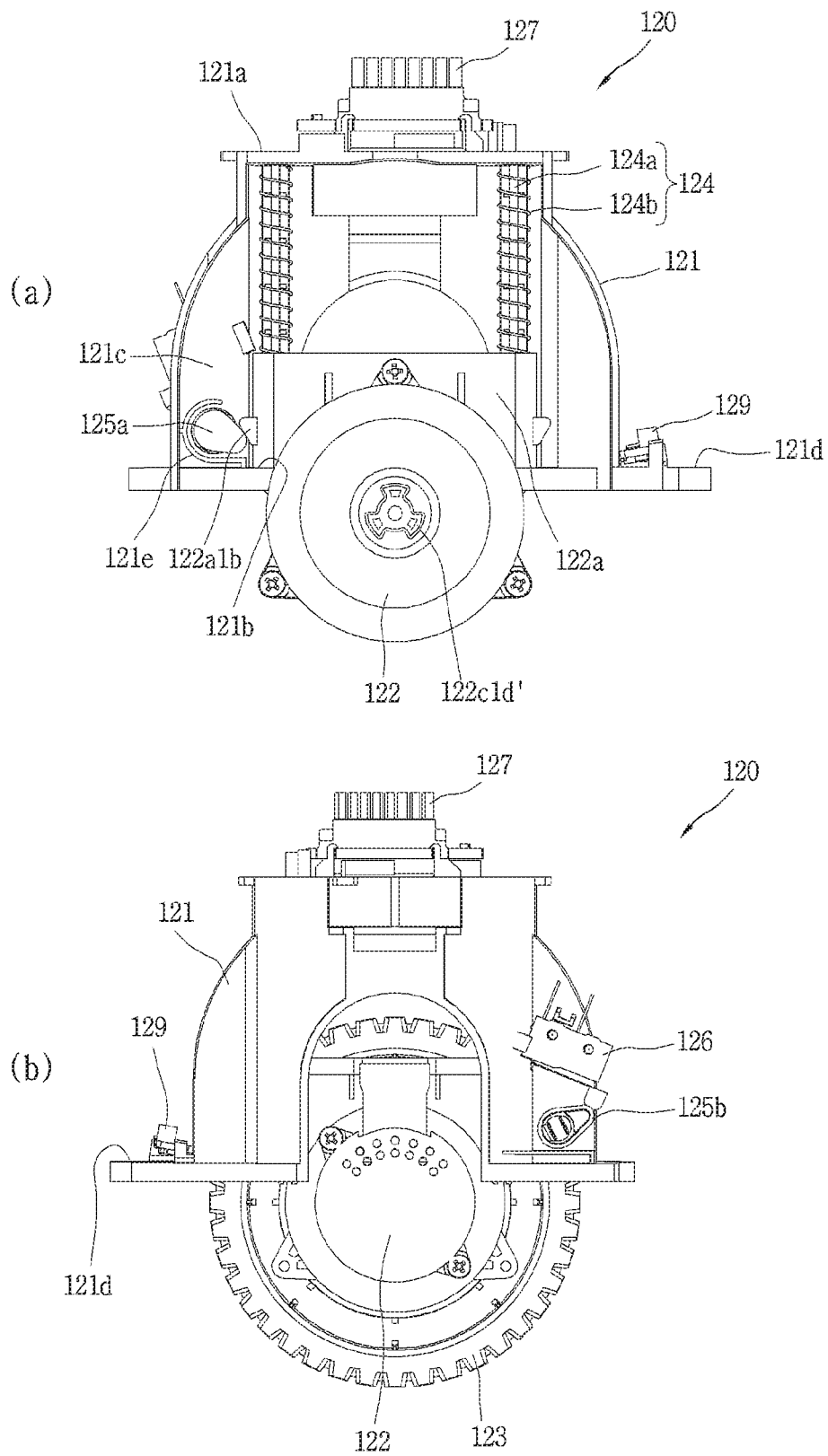
FIG. 15 is a conceptual view illustrating a state in which the driving module is moved downward in the wheel assembly of FIG. 3, viewed from the front surface (a) and the rear surface (b), respectively.
Figure 16:
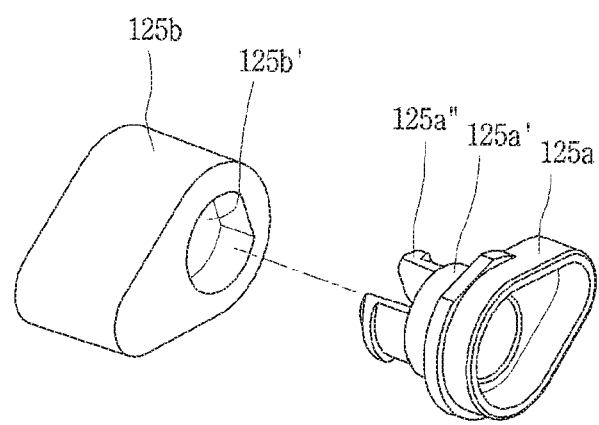
FIG. 16 is a conceptual view illustrating a link member illustrated in FIG. 14.

Portion (a) of FIG. 14 shows the driving module 122 being is moved upward in the wheel assembly 120 as viewed from a front surface (e.g., opposite to the drive motor 122*b*), and portion (b) of FIG. 14 shows the driving module 122 being moved upward in the wheel assembly 120 as viewed from a rear surface (e.g., corresponding to a position of the drive motor 122*b*). Portion (a) of FIG. 15 shows the driving module 122 being moved downward in the wheel assembly 120 as viewed from a front surface, and portion (b) of FIG. 15 shows the driving module 122 being moved downward in the wheel assembly 120 as viewed from the rear surface. FIG. 16 is a conceptual view illustrating a link member 125 illustrated in FIG. 14. FIG. 14 may correspond to the first state illustrated in FIG. 10, and FIG. 15 may correspond to the second state illustrated in FIG. 11. It should be noted that in portion (a) of FIG. 14 and portion (a) of FIG. 15, the driving wheel 123 is omitted for convenience of explanation.

Referring to FIGS. 14 to 16, the driving module 122 may be configured to be vertically movable along the guide bars 124*a* of the suspension 124. The driving wheel 123 may be coupled to the driving module 122 and, thus, may move together with the driving module 122.

FIG. 14 illustrates the first state in which the driving module 122 moves upward, such as moving upward based on supporting a weight of the cleaner main body 110. Thus, FIG. 14 shows a situation in which the driving wheel 123 contacts the floor surface and supports the cleaner main body 110. In this first state, the planetary gear device 122*c* may be fully accommodated in the wheel cover 121. As illustrated in FIG. 14, a center of the planetary gear device 122*c* may be located in the wheel cover 121.

In the first state, an upper end of the case 122*a* of the driving module 122 may be positioned to be spaced apart from the second fixing portion 121*b* by a maximum distance. The upper end of the case 122*a* may be positioned adjacent to the first fixing portion 121*a*. In the first state, the elastic member 124*b* connected to the first fixing portion 121*a* and the case 122*a*, respectively, may be compressed to a maximum extent, such as to be compressed against the first fixing portion 121*a*.

FIG. 15 illustrates the second state in which the driving module 122 is moved downward to the maximum. This position may indicate that the driving wheel 123 does not contact on the floor. In the second state, the planetary gear device 122*c* may be accommodated in the wheel cover 121 to a minimum extent. As illustrated in FIG. 15, the center of the planetary gear device 122c may be located below the wheel cover 121. In the second state, the case 122a of the driving module 122 may be extended to an extent allowed by the second fixing portion 121b. That is, the case 122a may be contact the second fixing portion 121b, thereby restricting any further downward movement of the driving module 122. The upper end of the case 122a may be spaced apart from the first fixing portion 121a by a maximum distance.

In the second state, the elastic member 124b connected to the first fixing portion 121a and the case 122a respectively may be pulled to the maximum distance. For example, the case 122a of the driving module 122 is configured to be vertically movable by the guide bar 124a between the first fixing portion 121a fixing the upper end of the guide bar 124a and the second fixing portion 121b fixing the lower end of the guide bar 124a. The upward movement of the case 122a may be restricted due to the maximum compression of the elastic member 124b, and the downward movement of the case 122a may be restricted due to the case 122a being locked by the second fixing portion 121b.

Meanwhile, the cleaner 100 may be configured to control the rotation of the driving wheel 123 by physically detecting when the driving wheel 123 is not in contact with the floor. Specifically, a link member 125 may be rotatably mounted on the wheel cover 121. In the example shown in FIG. 15, the link member 125 may be rotatably installed on a mounting portion 121c that is connecting the first fixing portion 121a and the second fixing portion 121b.

The link member 125 may include a first link 125a and a second link 125b that are coupled together. The first link 125a may be provided on one surface of the mounting portion 121c, and the second link 125b may be provided on another surface of the mounting portion 121c. The first and second links 125a and 125b may be coupled to each other and may rotate together. For the coupling, a coupling portion may protrude from one of the first and second links 125a and 125b, and a coupling hole 125b' in which the coupling portion is inserted may be formed on another one of the first and second links 125a and 125b.

The coupling hole 125b' may preferably be formed in a non-circular form to prevent the coupling portion from loosening when the coupling portion is inserted therein. The coupling portion may be provided with a coupling protrusion 125a' protruding into a shape corresponding to the coupling hole 125b' to be inserted into the coupling hole 125b', and an elastic pin 125a" protruding from the coupling protrusion 125a' and locking when inserted through the coupling hole 125b' so as to prevent separation of the first and second links 125a and 125b.

The link member 125 may be rotated when pressed or otherwise contacted based on the vertical movement of the driving wheel 123 within the wheel assembly 120. For example, when the pressed link member 125 is released, the link member 125 may rotate in an opposite direction due to a force applied by an elastic member (not illustrated) to return to an original position.

A rotation guide 121e that limits a rotation range of the first link 125a may be formed on one surface of the mounting portion 121c to surround a part of the first link 125a. That is, the first link 125a may be locked by the rotation guide 121e and its rotation range may be limited accordingly.

The first link 125a may rotate to be brought into contact with a protrusion 122a1b formed on the case 122a when the case 122a of the driving module 122 moves downward by a preset distance. The protrusion 122a1b may protrude from a side portion of the case 122a of the driving module 122 and may be inclined to smoothly press the first link 125a.

As illustrated in FIG. 14, the protrusion 122a1b and the first link 125a may be spaced apart from each other when the upper end of the case 122a is spaced apart from the second fixing portion 121b by a predetermined distance. As the case 122a gradually moves downward, the protrusion 122a1b and the first link 125a may gradually move closer to each other. When the case 122a is further moved downward when the protrusion 122a1b and the first link 125a are in contact with each other, the protrusion 122a1b may press against and rotate the first link 125a.

The rotation, as illustrated in FIG. 15, may continue until the case 122a is locked by the second fixing portion 121b. As described above, when the case 122a is locked by the second fixing portion 121b indicates that the driving wheel 123 is not contacting the floor and not supporting the weight of the cleaner main body 110, that is, the driving wheel 123 is fully extended without being brought into contact with the floor.

The switch 126 may be pressed in response to the rotation of the second link 125b and may be provided on the another surface of the mounting portion 121c where the second link 125b is located. The switch 126 may be mounted on the wheel cover 121 and may be electrically connected to the second connector 127. When the case 122a is locked by the second fixing portion 121b, the second link 125b connected to the first link 125a may press or otherwise activate the switch 126, and the pressed switch 126 may transfer a pressing signal to the controller.

When the switch 126 is pressed, the controller may control the operation of the driving motor 122b. For example, when the switch 126 is pressed, the controller may stop the operation of the driving motor 122b to prevent the rotation of the driving wheel 123. The control may be performed, for example, when the switches 126 provided on the respective left and right driving wheels 123 of the cleaner main body 110 are all pressed (e.g., none of the wheels 123 is contacting the floor). This may be understood as stopping the rotating of the driving wheels 123 when the cleaner main body 110 is lifted by the user.

As another example, when a switch 126 provided on one of the left and right driving wheels 123 of the cleaner main body 110 is pressed, the controller may operate the driving motor 122b in an opposite direction so that the driving wheel 123 is rotated in the opposite direction. This may be understood as a control for escaping an obstacle when one of the driving wheels 123 is idled due to the cleaner main body 110 being caught by the obstacle. For example, a portion of the cleaner main body 110 may be lifted by an obstacle such the one driving wheel 123 is not in contact with the floor surface while another driving wheel 123 contacts the floor surface, and the controller may direct driving power only to driving wheel 123 that contacts the floor surface/

As aforementioned, when one driving wheel 123 loses contact with the floor, the loss of contact by that driving wheel 123 can be detected by a mechanism that the protrusion of the driving module 122 rotates the link member 125 and the rotated link member 125 presses the switch 126 when the driving module 122 is moved downward by a preset distance. Accordingly, that driving wheel 123 that does not contact the floor surface can be controller (e.g., stopped) so that stability of the cleaner can be improved and the user's satisfaction can be improved.

The foregoing description has been given of the detailed structure of the wheel assembly 120 on the basis of the structure in which the wheel assembly 120 is detachably coupled to the cleaner main body 110. However, certain components, such as the driving module 122, the suspension 124, the link member 125, the switch 126, and/or the cliff sensor 129 may be mounted on the cleaner main body 110 and without being included in the wheel assembly 110. In this alternative configuration, the function of the wheel cover 121 described above may be substituted by a wheel housing of the cleaner main body 110. For example, the wheel housing may be formed to surround an upper portion of the driving wheel 123.

For example, the wheel housing may be provided with the first and second fixing portions 121a and 121b on which the guide bar 124a may be mounted. The link member 125 may be rotatably mounted on the mounting portion 121c of the wheel house, and the switch 126 may also be mounted on the mounting portion 121c of the wheel house. The cliff sensor 129 may be provided on the wheel house or the lower portion of the cleaner main body 110 adjacent to the wheel house.

Also, the foregoing description has been given exemplarily of a robot cleaner, to which the present disclosure is applied. The robot cleaner is merely illustrative to help understanding the example to which the present disclosure is applied, but it should not be construed that the present disclosure is applied only to the robot cleaner. That is, the above-described structure can be applied to any structure having the driving wheel 123 that is rotated by driving force in every type of cleaner such as a canister type, an upright type and the like.

A first aspect of the present disclosure is to provide a cleaner, capable of exhibiting the same suspension performance regardless of a rotating direction of a driving wheel. A second aspect of the present disclosure is to provide a cleaner having a miniaturized structure associated with an operation of a driving wheel. A third aspect of the present disclosure is to provide a cleaner, in which a structure associated with an operation of a driving wheel can be mounted on a cleaner main body so as to be electrically connected to the cleaner main body, and of which repair is facilitated. A fourth aspect of the present disclosure is to provide a cleaner, capable of controlling a rotation of a driving wheel by physically detecting a state where a driving wheel is not brought into contact with a floor surface.

To achieve the first aspect of the present disclosure, there is provided a cleaner including a cleaner main body having a controller, a wheel cover mounted on the cleaner main body, a driving module coupled to the wheel cover to be movable up and down, a driving wheel coupled to the driving module and configured to be rotatable by receiving driving force from the driving module, a guide bar coupled to the wheel cover and provided in an up and down direction, the guide bar being inserted through the driving module to guide the upward and downward movement of the driving module, and an elastic member surrounding the guide bar and connected to the wheel cover and the driving module, respectively, to absorb impacts while the driving module is moved up and down.

The first aspect of the present disclosure may also be achieved by a cleaner, which includes a cleaner main body having a controller, a driving module provided with a case coupled to a wheel house of the cleaner body to be movable up and down, a driving motor mounted to the case, and a planetary gear device for reducing revolution of the driving motor, a driving wheel connected to the planetary gear device to be rotatable, a guide bar coupled to the wheel cover, provided in an up and down direction, and inserted through the case to guide the upward and downward movement of the case, and an elastic member surrounding the guide bar and connected to the wheel house and the case, respectively, to absorb impacts while the case is moved up and down.

To achieve the second aspect of the present disclosure, there is provided a cleaner including a cleaner main body having a controller, a wheel cover mounted to the cleaner main body, a driving module provided with a case coupled to the wheel cover to be movable up and down, a driving motor mounted to the case, and a planetary gear device for reducing revolution of the driving motor, a driving wheel connected to the planetary gear device to be rotatable, and a suspension configured to guide the upward and downward movement of the case and absorb impacts while the case is moved up and down. A rotating shaft of the driving motor and a rotating shaft of the driving wheel may be coaxially arranged, and the driving wheel may be provided with an accommodating portion formed at an inner side thereof to accommodate the planetary gear device.

The second aspect of the present disclosure may also be achieved by a cleaner which includes a cleaner main body having a controller, a driving module provided with a case coupled to a wheel house of the cleaner body to be movable up and down, a driving motor mounted to the case, and a planetary gear device for reducing revolution of the driving motor, a driving wheel connected to the planetary gear device to be rotatable, and a suspension configured to guide the upward and downward movement of the case and absorb impacts while the case is moved up and down. A rotating shaft of the driving motor and a rotating shaft of the driving wheel may be coaxially arranged, and the driving wheel may be provided with an accommodating portion formed at an inner side thereof to accommodate the planetary gear device.

In order to achieve the third aspect of the present disclosure, there is provided with a cleaner including a cleaner main body having a mounting portion recessed upwardly at a lower portion thereof, and a wheel assembly detachably mounted on the mounting portion. A first connector may be provided on an inner surface of the mounting portion facing an opening of the mounting portion in a manner of facing the opening, and a second connector may be provided on an upper portion of the wheel assembly, and may be connected to the first connector when the wheel assembly is accommodated in the mounting portion. The cleaner may further include a coupling unit coupling the wheel assembly to the cleaner main body when the wheel assembly is accommodated in the mounting portion.

In order to achieve the fourth aspect of the present disclosure, there is provided a cleaner including a cleaner main body having a controller, a wheel cover mounted on the cleaner main body, a driving module coupled to the wheel cover to be movable up and down, a driving wheel coupled to the driving module and configured to be rotatable by receiving driving force from the driving module, a suspension configured to guide the up and down movement of the driving module and absorb impacts while the driving module is moved up and down, a link member rotatably installed on the wheel cover, and rotated by being in contact with a protrusion formed on the driving module when the driving module is moved downward by a preset distance, and a switch pressed in response to the rotation of the link member to transmit a pressing signal to the controller.

The fourth aspect of the present disclosure may also be achieved by a cleaner which includes a cleaner main body having a controller, a driving module provided with a case coupled to a wheel house of the cleaner main body to be movable up and down, a driving motor mounted to the case, and a planetary gear device for reducing revolution of the driving motor, a driving wheel connected to the planetary gear device to be rotatable, a link member rotatably installed on the wheel house, and rotated by being in contact with a protrusion formed on the case when the case is moved downward by a preset distance, and a switch pressed in response to the rotation of the link member to transmit a pressing signal to the controller.

The aforementioned cleaner can be configured as follows. The driving module may include a case having a through-hole into which the guide bar is inserted, a driving motor mounted on the case, and a planetary gear device connecting the driving motor and the driving wheel to each other, and reducing revolution of the driving motor to transfer the reduced revolution to the driving wheel. The planetary gear device may include a first planetary gear part interlocked with a rotating shaft of the driving motor, and a second planetary gear part interlocked with the first planetary gear part and connected to the driving wheel.

The case may include a main case having the through-hole and the driving motor mounted thereon, and accommodating the first planetary gear part therein, a middle case coupled to the main case to cover the first planetary gear part, and accommodating the second planetary gear part, and a front case coupled to the middle case to cover the second planetary gear part.

The first planetary gear part may include a first sun gear coupled to a rotating shaft of the driving motor, a first ring gear formed on the main case and accommodating the first sun gear therein, a plurality of first planetary gears engaged with the first sun gear and the first ring gear, rotating in an opposite direction to a rotating direction of the first sun gear, and revolving in the same direction as the rotating direction of the first sun gear centering on the first sun gear, and a first cage rotatably supporting a rotating shaft of each of the plurality of first planetary gears.

The second planetary gear part may include a second sun gear provided on the first cage, a second ring gear formed on the middle case and accommodating the second sun gear therein, a plurality of second planetary gears engaged with the second sun gear and the second ring gear, rotating in an opposite direction to a rotating direction of the second sun gear, and revolving in the same direction as the rotating direction of the second sun gear centering on the second sun gear, and a second cage rotatably supporting a rotating shaft of each of the plurality of second planetary gears.

The second cage may be provided with a coupling protrusion engaged with a coupling groove of the driving wheel to prevent the driving wheel from being idled. The wheel cover or the wheel house may include a first fixing portion to which an upper end of the guide bar is fixed, and a second fixing portion formed to face the first fixing portion, and to which a lower end of the guide bar is fixed. The case may be configured to be movable up and down by the guide bar between the first fixing portion and the second fixing portion.

The case may be locked by the second fixing portion when the case is moved downward by a predetermined distance. The elastic member may be connected to the first fixing portion and the case, respectively. The controller may stop an operation of the driving motor when the switch is pressed.

The link member may include a first link exposed to one side of the wheel cover where the protrusion is located, and a second link coupled to the first link and exposed to another side of the wheel cover where the switch is located.

The effects of the present disclosure obtained by the aforementioned solutions are as follows. First, a driving module coupled to a driving wheel can be movable up and down along a guide bar and an elastic member can absorb impacts generated while the driving module is moved up and down, which may result in uniformly realizing a grounding function and an impact buffering function, irrespective of a rotating direction of the driving wheel.

Second, a gear device for reducing revolution of a driving motor and transmitting the reduced revolution to a driving wheel can be configured as a planetary gear device. Accordingly, a rotating shaft of the driving motor and a rotating shaft of the driving wheel can be coaxially arranged and the planetary gear device can be accommodated in an accommodating portion formed inside the driving wheel, thereby miniaturizing a structure related to an operation of the driving wheel. This can contribute to miniaturization of the cleaner or to an increase in a volume of another component (for example, a dust container).

Third, when a wheel assembly is inserted into a mounting portion formed in a cleaner main body, a first connector provided on the mounting portion can be connected to a second connector provided on the wheel assembly, thereby facilitating mounting and electric connection of the wheel assembly to the cleaner main body. In addition, when the wheel assembly is in trouble, only the wheel assembly can be detached from the cleaner main body for inspection, repair, replacement, and the like. This may result in facilitating maintenance of the wheel assembly.

Fourth, in a situation that the driving wheel is not brought into contact with the floor occurs, the rotation or revolution of the driving wheel can be controlled (e.g., stopped) by a mechanism that a protrusion of the driving module rotates a link member and the rotated link member presses a switch when the driving module is moved downward by a preset distance. This may result in improving stability and user's satisfaction.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner, comprising:
a cleaner body having a controller;
a wheel cover mounted to the cleaner body;
a motor that is connected to the wheel cover and generates a driving force;
a driving wheel that is coupled to the motor and rotates based on receiving the driving force from the motor;

a suspension that guides a vertical movement of the motor and absorbs impacts during the vertical movement of the motor;

a link that is rotatably installed on the wheel cover and rotates based on contacting a protrusion connected to the motor when the motor moves downward by a prescribed distance; and a switch that is activated during the rotation of the link and transfers a signal to the controller when activated, wherein the link includes:

a first link exposed to one surface of the wheel cover where the protrusion is located; and a second link coupled to the first link and exposed to another surface of the wheel cover where the switch is located.

2. The cleaner of claim 1, wherein the controller stops an operation of the motor when the switch is activated.

3. The cleaner of claim 1, wherein the suspension includes:

a guide bar that is coupled to the wheel cover, extends vertically, and guides the vertical movement of the motor; and a spring that surrounds the guide bar, and is supported on the wheel cover and the motor, respectively, to absorb the impacts during the vertical movement of the motor.

4. The cleaner of claim 3, further comprising:

a case having a through-hole into which the guide bar is inserted, wherein the motor is mounted to the case; and a planetary gear train that connects the motor and the wheel and is configured to receive the driving force from the motor and to transfer the driving force to the wheel.

5. The cleaner of claim 4, wherein a rotating shaft of the motor and a rotating axis of the wheel are coaxially arranged.

6. The cleaner of claim 4, wherein the wheel cover includes:

a first fixing surface to which an upper end of the guide bar is fixed; and a second fixing surface formed to face the first fixing surface, and to which a lower end of the guide bar is fixed, and wherein guide bar directs the case to move vertically between the first fixing surface and the second fixing surface.

7. The cleaner of claim 6, wherein the second fixing surface blocks the case from moving more than a prescribed distance downward.

8. The cleaner of claim 6, wherein the spring is connected to the first fixing surface and the case, respectively.

9. The cleaner of claim 4, wherein the planetary gear train comprises:

a first planetary gear stage interlocked with a rotating shaft of the motor; and a second planetary gear stage interlocked with the first planetary gear stage and connected to the wheel.

10. The cleaner of claim 9, wherein the case includes:

a first case having the through-hole and the motor mounted thereon, and accommodating the first planetary gear stage therein;

a second case coupled to the first case, provided to cover the first planetary gear stage, and accommodating the second planetary gear stage; and a third case coupled to the second case and provided to cover the second planetary gear stage.

11. The cleaner of claim 10, wherein the first planetary gear stage includes:

a first sun gear coupled to the rotating shaft of the motor;

a first ring gear formed on the second case and accommodating the first sun gear therein;

a plurality of first planetary gears engaged with the first sun gear and the first ring gear, rotating in an opposite direction to a rotating direction of the first sun gear, and revolving in the same direction as the rotating direction of the first sun gear centering on the first sun gear; and a first cage rotatably supporting rotating shafts of the plurality of first planetary gears.

12. The cleaner of claim 11, wherein the second planetary gear stage includes:

a second sun gear provided on the first cage;

a second ring gear formed on the middle case and accommodating the second sun gear therein;

a plurality of second planetary gears engaged with the second sun gear and the second ring gear, rotating in an opposite direction to a rotating direction of the second sun gear, and revolving in the same direction as the rotating direction of the second sun gear centering on the second sun gear; and a second cage rotatably supporting rotating shafts of the plurality of second planetary gears.

13. The cleaner of claim 12, wherein the second cage includes a coupling protrusion that engages a coupling groove of the wheel.

14. The cleaner of claim 1, wherein the driving wheel includes an accommodating recess formed at an inner side thereof to accommodate at least part of the motor.

15. The cleaner of claim 1, wherein the cleaner body includes a mounting recess that extends upwardly from a lower portion thereof, wherein a first connector is electrically connected to the controller and is provided on an inner surface of the mounting recess to face an opening of the mounting recess, and wherein a second connector is electrically connected to the motor and is provided on an upper portion of the wheel cover, the second connector being connected to the first connector when the wheel cover is received in the mounting portion.

16. A cleaner, comprising:

a case that is coupled to a wheel housing of the cleaner body and that moves vertically in the wheel housing;

a motor that is mounted to the case;

a planetary gear train that receives a driving force from the driving motor;

a wheel that is connected to the planetary gear train and rotates based on the receiving the driving force via the planetary gear train;

a link that is rotatably connected to the wheel housing, and is rotated by being in contact with a protrusion formed on the case when the case is moved downward by a prescribed distance; and a switch that is activated during the rotation of the link and transfers a signal to a controller of the cleaner when activated, wherein the link includes:

a first link exposed to one surface of the case where the protrusion is located; and a second link coupled to the first link and exposed to another surface of the case where the switch is located.

17. The cleaner of claim 16, wherein the controller modifies an operation of the motor based on receiving the signal from the switch.

18. The cleaner of claim 16, further comprising:
a guide bar that is coupled to the wheel housing, extends in a vertical direction, and is inserted through the case to guide a vertical movement of the case; and
a spring that is provided to surround the guide bar, and is supported on the wheel housing and the case, respectively, to absorb impacts while the case is moved vertically.

19. A cleaner, comprising:
a cleaner body having a controller;
a wheel cover mounted to the cleaner body;
a motor that is connected to the wheel cover and generates a driving force;
a driving wheel that is coupled to the motor and rotates based on receiving the driving force from the motor;
a suspension that guides a vertical movement of the motor and absorbs impacts during the vertical movement of the motor;
a link that is rotatably installed on the wheel cover and rotates based on contacting a protrusion connected to the motor when the motor moves downward by a prescribed distance; and
a switch that is activated during the rotation of the link and transfers a signal to the controller when activated,
wherein the driving wheel includes an accommodating recess formed at an inner side thereof to accommodate at least part of the motor.

* * * * *